(12) United States Patent
Botker et al.

(10) Patent No.: US 11,598,686 B2
(45) Date of Patent: Mar. 7, 2023

(54) TEMPERATURE COMPENSATION OF STRAIN GAUGE OUTPUT

(71) Applicant: DJ Instruments, Billerica, MA (US)

(72) Inventors: Thomas Lloyd Botker, Andover, MA (US); Louis Panagotopulos, Nalpole, MA (US)

(73) Assignee: DJ Instruments, Billerica, MA (US)

( * ) Notice: Subject to any disclaimer, the term of this patent is extended or adjusted under 35 U.S.C. 154(b) by 195 days.

(21) Appl. No.: 17/085,323

(22) Filed: Oct. 30, 2020

(65) Prior Publication Data

US 2021/0131898 A1 May 6, 2021

Related U.S. Application Data

(60) Provisional application No. 62/928,917, filed on Oct. 31, 2019.

(51) Int. Cl.
*G01L 9/04* (2006.01)
*G01L 19/04* (2006.01)
*G01L 9/00* (2006.01)

(52) U.S. Cl.
CPC ............ *G01L 9/045* (2013.01); *G01L 9/0055* (2013.01)

(58) Field of Classification Search
CPC . G01L 9/00; G01L 9/0055; G01L 9/04; G01L 9/045; G01L 19/04; G01L 19/14
See application file for complete search history.

(56) References Cited

U.S. PATENT DOCUMENTS

| 4,283,941 | A | 8/1981 | Kutsay |
| 6,453,747 | B1 | 9/2002 | Weise et al. |
| 6,973,837 | B2 | 12/2005 | Barnett |
| 7,918,137 | B2 | 4/2011 | Kurtz et al. |
| 8,024,978 | B2 | 9/2011 | Khemet et al. |
| 2004/0159161 | A1 | 8/2004 | Barnett |
| 2005/0927079 | | 5/2005 | Ales et al. |

(Continued)

FOREIGN PATENT DOCUMENTS

| CN | 206856415 U | 1/2018 | |
| EP | 1602907 A1 * | 12/2005 | ........... G01D 18/006 |

(Continued)

OTHER PUBLICATIONS

PCT International Preliminary Report on Patentability in International Appln. No. PCT/US2020/058340, dated May 12, 2022, 9 pages.

(Continued)

*Primary Examiner* — Nguyen Q. Ha
(74) *Attorney, Agent, or Firm* — Fish & Richardson P.C.

(57) ABSTRACT

An apparatus includes a casing defining a fluid flow channel, the casing including one or more diaphragms each defining a portion of the fluid flow channel, a strain gauge disposed on one of the one or more diaphragms, the strain gauge having a characteristic responsive to a pressure of fluid in the fluid flow channel, a temperature-sensitive circuit element disposed on one of the one or more diaphragms, the temperature-sensitive circuit element having a characteristic responsive to a temperature of the fluid in the fluid flow channel, and temperature compensation circuitry electrically coupled to the strain gauge and to the temperature-sensitive circuit element.

39 Claims, 9 Drawing Sheets

(56) References Cited

U.S. PATENT DOCUMENTS

2008/0260558 A1   10/2008   Luongo et al.
2016/0315247 A1   10/2016   Boser et al.

FOREIGN PATENT DOCUMENTS

| JP | 10132676 A | * | 5/1998 | | |
| JP | H11508037 | | 7/1999 | | |
| JP | 2002310826 A | * | 10/2002 | ......... | G01L 19/0061 |
| JP | 2014215045 A | * | 11/2014 | ......... | G01L 19/0061 |

OTHER PUBLICATIONS

[No Author Listed], "Strain Gage Based Transducers," Measurements Group, Inc., 1988, 80 pages.
[No Author Listed], "Strain Gage Thermal Output and Gage Factor Variation with Temperature," Vishay, 2007, 35-47.
International Search Report and Written Opinion in International Appln. No. PCT/US2020/058340, dated Feb. 3, 2021, 11 pages.

* cited by examiner

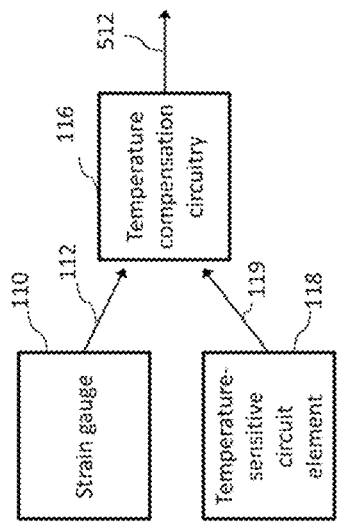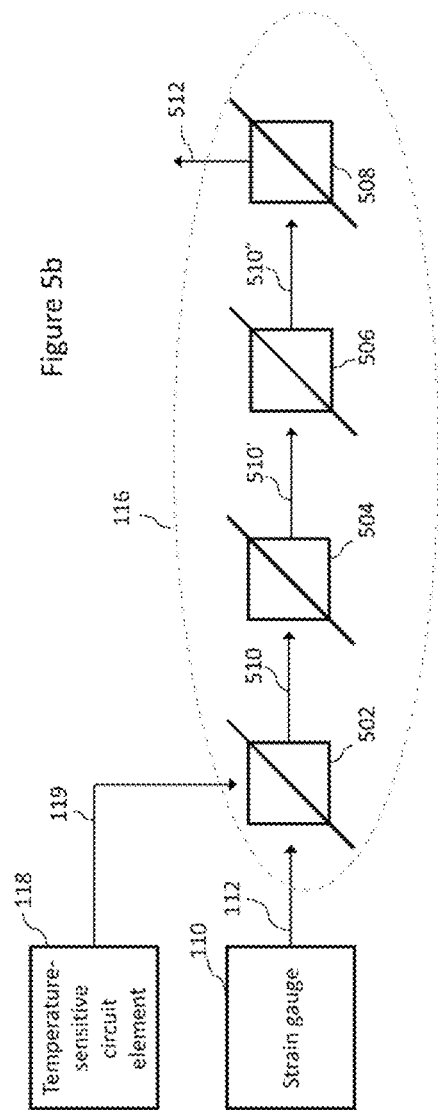

TEMPERATURE COMPENSATION OF STRAIN GAUGE OUTPUT

CROSS-REFERENCE TO RELATED APPLICATIONS

This application claims the benefit of priority to U.S. Provisional Patent Application No. 62/928,917, filed Oct. 31, 2019, the entire disclosure of which is incorporated herein by reference.

BACKGROUND

This description relates to pressure measurements of a fluid.

Fluid pressures can be measured by detecting the deformation of an element in which the fluid is contained. For instance, the element can include a resistor having a resistance that changes with deformation such that the resistance is indicative of the pressure applied to the element.

SUMMARY

We describe here a pressure measurement device with temperature compensation capabilities. A fluid flow channel is defined in a casing, and a strain gauge on the casing is used to measure the pressure of the fluid. A temperature compensation element is used to modify the output of the strain gauge to control for the effects of temperature variation, allowing the fluid pressure to be determined accurately and consistently.

In an aspect, an apparatus includes a casing defining a fluid flow channel, the casing including one or more diaphragms each defining a portion of the fluid flow channel, a strain gauge disposed on one of the one or more diaphragms, the strain gauge having a characteristic responsive to a pressure of fluid in the fluid flow channel, a temperature-sensitive circuit element disposed on one of the one or more diaphragms, the temperature-sensitive circuit element having a characteristic responsive to a temperature of the fluid in the fluid flow channel, and temperature compensation circuitry electrically coupled to the strain gauge and to the temperature-sensitive circuit element.

Embodiments can include any combination of one or more of the following features.

The temperature compensation circuitry is configured to modify an output of the strain gauge based on the characteristic of the temperature-sensitive circuit element to compensate for temperature variation.

The one or more diaphragms are configured to deform in response to the pressure of the fluid.

An output of the strain gauge is indicative of a pressure of the fluid.

The strain gauge and the temperature-sensitive circuit element are both disposed on the same particular diaphragm. The strain gauge is disposed on a first portion of the particular diaphragm. The temperature-sensitive circuit element is disposed on a second portion of the particular diaphragm. A thickness of the second portion is greater than a thickness of the first portion. The strain gauge is disposed on a flat surface of the first portion of the particular diaphragm, and the temperature-sensitive circuit element is disposed on a flat surface of the second portion of the particular diaphragm. The first portion and the second portion are configured to deform in response to the pressure of the fluid. At a given fluid pressure, a degree of deformation of the first portion is greater than a degree of deformation of the second portion.

The strain gauge is mounted on a backing, the backing providing a thermal time constant for heat transfer between the fluid and the strain gauge that is substantially equal to a thermal time constant for heat transfer between the fluid and the temperature-sensitive circuit element.

The temperature-sensitive circuit element includes a resistor. The resistor has a resistance value sufficient to compensate for temperature-induced pressure span error in an output of the strain gauge. The resistor has a resistance value sufficient to compensate for temperature-induced zero balance pressure error in an output of the strain gauge.

The temperature-sensitive circuit element includes a diode.

The casing is formed of metal.

The temperature compensation circuitry includes an adjustable circuit element adjustable to calibrate the temperature compensation circuitry. The adjustable circuit element includes a potentiometer. The adjustable circuit element is automatically adjustable.

The temperature compensation circuitry includes a microcontroller configured to calibrate the temperature compensation circuitry.

The strain gauge includes one or more resistors of a set of multiple resistors forming a Wheatstone bridge. The Wheatstone bridge is configured in a full-bridge arrangement.

A groove is defined in the casing.

The casing has a diameter of less than 0.06 inches, e.g., less than 0.02 inches.

At least one of the one or more diaphragms has a thickness of less than 0.008 inches, e.g., less than 0.002 inches.

In an aspect, combinable with the previous aspect, a method includes flowing a fluid through a fluid flow channel, one or more diaphragms each defining a portion of the fluid flow channel. A characteristic of a strain gauge disposed on one of the one or more diaphragms is responsive to a pressure of the fluid in the fluid flow channel, and a characteristic of a temperature-sensitive circuit element disposed on one of the one or more diaphragms is responsive to a temperature. The method includes modifying an output of the strain gauge based on the characteristic of the temperature-sensitive circuit element to compensate for temperature variation.

Embodiments can include any combination of one or more of the following features.

The characteristic of the strain gauge is responsive to a deformation of the diaphragm on which the strain gauge is disposed.

The method includes determining the pressure of the fluid in the fluid flow channel based on the modified output of the strain gauge.

Modifying the output of the strain gauge includes applying a voltage to a terminal of the strain gauge, wherein the applied voltage is based on the characteristic of the temperature-sensitive circuit element.

Modifying the output of the strain gauge includes performing temperature-induced zero balance pressure correction of the output of the strain gauge.

Modifying an output of the strain gauge includes performing temperature-induced pressure span correction on the output of the strain gauge.

Modifying an output of the strain gauge includes performing non-temperature-induced zero balance pressure correction of the output of the strain gauge.

Modifying an output of the strain gauge includes performing non-temperature-induced pressure span correction of the output of the strain gauge.

Modifying an output of the strain gauge includes reducing an effect of temperature variation on the output of the strain gauge.

The method includes adjusting an adjustable circuit element to calibrate the modification of the output of the strain gauge.

In an aspect, combinable with one or more of the previous aspects, a method for fabricating a pressure gauge includes defining a fluid flow path through a casing, thinning a portion of the casing to form a diaphragm, and disposing a strain gauge and a temperature-sensitive circuit element on the diaphragm, the strain gauge having a characteristic responsive to a pressure of fluid in the fluid flow path, and the temperature-sensitive circuit element having a characteristic responsive to temperature.

Embodiments can include any combination of one or more of the following features.

The thinning includes thinning a first portion of the casing to a first thickness and thinning a second portion of the casing to a second thickness, the second thickness being greater than the first thickness. The method includes disposing the strain gauge on the first portion of the diaphragm and disposing the temperature-sensitive circuit element on the second portion of the diaphragm.

The method includes electrically coupling an output of the strain gauge and an output of the temperature-sensitive circuit element to temperature compensation circuitry, wherein the temperature compensation circuitry is configured to modify an output of the strain gauge based on the characteristic of the temperature-sensitive circuit element. The method includes calibrating the temperature compensation circuitry.

The approaches described here can have one or more of the following advantages. The approaches can enable the measurement of low fluid pressures, for example, fluid pressures of 15 psi or less. Pressures of flowing fluids can be measured. Accurate and stable fluid pressure measurements can be achieved, even when the fluid temperature fluctuates or when temperature variations are present. Fluid pressures can be measured by a device without dead volume in which no active fluid flow occurs. Accurate fluid pressure sensors can be fabricated.

The details of one or more implementations are set forth in the accompanying drawings and the description below. Other features and advantages will be apparent from the description and drawings, and from the claims.

BRIEF DESCRIPTION OF DRAWINGS

FIGS. 5A-5B are flow charts.

DETAILED DESCRIPTION

We describe here a pressure measurement device with temperature compensation capabilities. A fluid flow channel is defined in a casing, and a strain gauge on the casing is used to measure the pressure of the fluid. A temperature compensation element is used to modify the output of the strain gauge to control for the effects of temperature variation, allowing the fluid pressure to be determined accurately and consistently.

Figure 1:
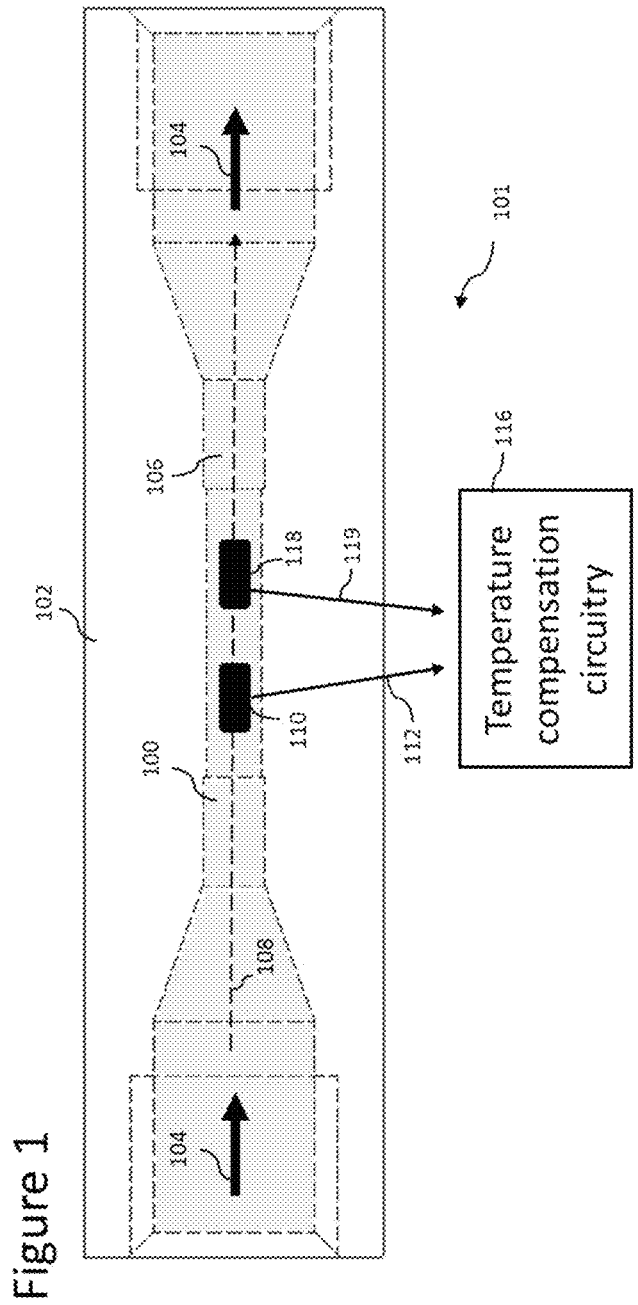
FIG. 1 is a side view of an example device.

FIG. 1 shows an example of a pressure measurement device 101. A fluid flow channel 100 defined through a casing 102 receives flow 104 of a fluid 106 along a fluid flow path 108. The fluid has a fluid pressure and a fluid temperature. The fluid pressure exerts pressure on the casing 102 and can cause deformation of the casing 102, e.g., causing deformation of sufficiently thin portions of the casing 102, such as a thin diaphragm (not shown) formed in the casing. The degree of deformation of the diaphragm is dependent on the fluid pressure; high fluid pressures induce larger deformations than low fluid pressures. A strain gauge 110 is disposed on the diaphragm. A characteristic of the strain gauge is responsive to deformation of the diaphragm and thus responsive to the fluid pressure, such that an output 112 of the strain gauge 110 is indicative of the fluid pressure. For example, the strain gauge 110 can be one or more resistors having a resistance that varies with deformation of the diaphragm, indicating the fluid pressure. A qualitative or quantitative measurement of the fluid pressure can be obtained based on the value of the strain gauge output 112.

Temperature variations, e.g., variations over time or between elements of the strain gauge 110, can affect the strain gauge output 112. A characteristic of a temperature-sensitive circuit element 118 is responsive to temperature, e.g., on fluid temperature, and an output, such as a current or voltage output, of the temperature-sensitive circuit element 118 is used to adjust the strain gauge output 112 to compensate for these temperature variations. In some examples, the temperature-sensitive circuit element 118 is a resistor having a resistance that depends on temperature, e.g., on the fluid temperature. In some examples, the temperature-sensitive circuit element 118 is a diode having a current that changes with temperature at constant voltage. Temperature compensation circuitry 116 coupled to both the strain gauge 110 and the temperature-sensitive circuit element 118 adjusts the strain gauge output 112 based on the output of the temperature-sensitive circuit element 118. The adjusted strain gauge output enables accurate and consistent pressure determination despite temperature variations.

The temperature-sensitive circuit element 118 can be disposed on the casing 102, e.g., on the same diaphragm as the strain gauge 110 or on a different diaphragm such that the temperature variations experienced by the temperature-sensitive circuit element 118 are substantially similar to the temperature variations experienced by the strain gauge 110. For instance, the temperature-sensitive circuit element 118 can be thermally coupled to the fluid 106 such that heat can flow between the fluid 106 and the temperature-sensitive circuit element 118.

Figure 2C:
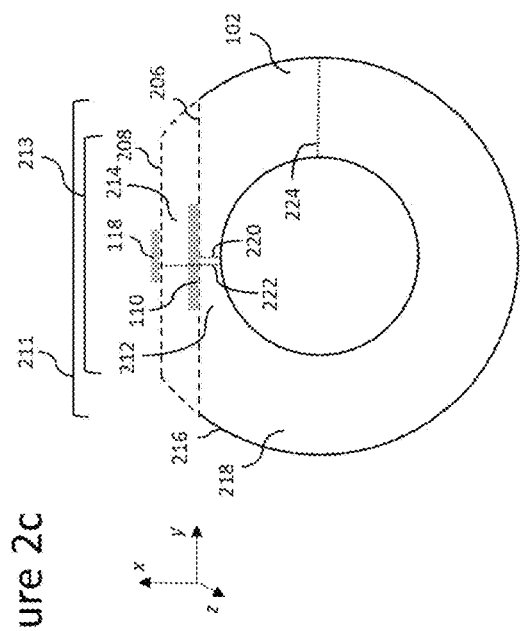
FIG. 2C is a cross-sectional view of an example casing.
Figure 2D:
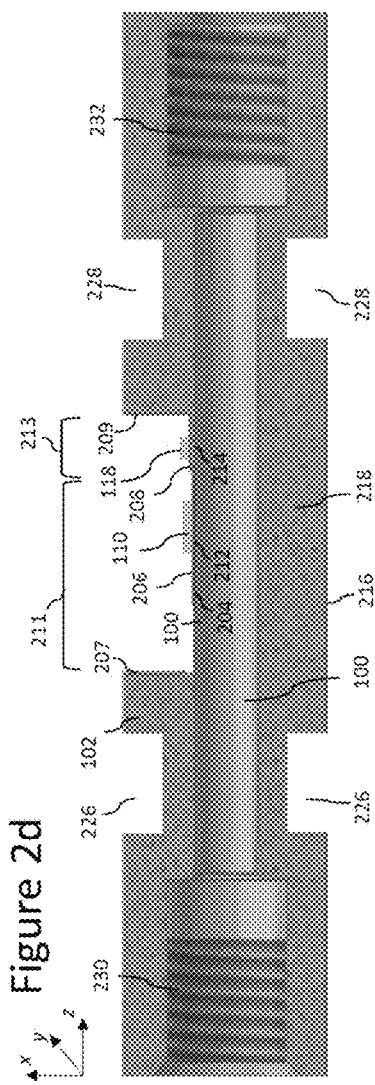
FIG. 2D is a side view of an example casing.
Figure 2A:
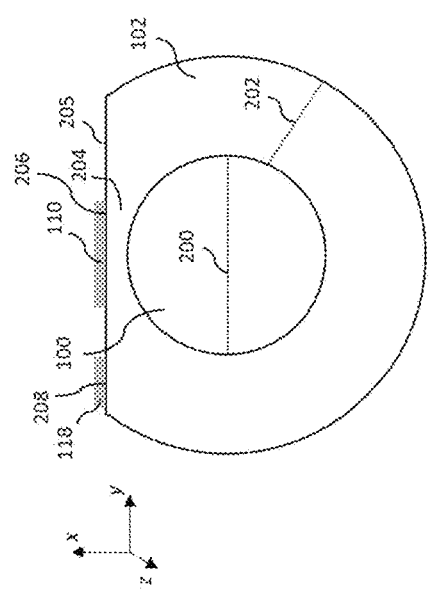
FIG. 2A is a cross-sectional view of an example casing.

In some examples, as shown in FIG. 2A, the fluid flow channel 100 has a circular or nearly circular cross-section 200, and the casing 102 has, in some portions, an annular cross-section 202. Other cross-sectional shapes of the casing 102 are also possible. In some examples, the casing 102 can have a cross-sectional shape or size that changes along its length. In examples in which the casing 102 has a cross-sectional shape that is not a circle, "circumference" refers to the non-circular perimeter around the cross-sectional shape.

The casing 102 can be made of a chemical-resistant metal, plastic, or a combination of multiple materials. In some examples, the casing 102 is made of a material, such as titanium or stainless steel, that has a relatively low elastic modulus. A low elastic modulus of the casing 102 can mean that the casing 102 will deform more for a given fluid pressure than if the casing 102 had a higher elastic modulus, and thus that the strain gauge 110 can be sensitive to lower fluid pressures.

The fluid flow channel 100 can have a small volume. For example, cross-section 200 of the fluid flow channel 100 can have a diameter of less than 0.05 inches, or less than 0.01 inches, or less than 0.006 inches. A small fluid flow channel volume can be beneficial when, for example, the available amount of fluid 106 is small, such as for blood testing or other biological applications. With a small fluid flow channel volume, even a small amount of available fluid can entirely fill the fluid flow channel 100, enabling accurate measurements of the fluid pressure.

The strain gauge output 112 is responsive to deformation of the casing 102 caused by the fluid pressure, with the degree of deformation depending on, among other factors, the local thickness of the casing 102. In some examples, the strain gauge 110 or the temperature-sensitive circuit element 118 or both are disposed on a diaphragm 204, which is a portion of the casing 102 that is thinner than surrounding portions of the casing 102. For instance, portions of the diaphragm 204 can have a thickness of, for example, less than 0.008 inches, less than 0.003 inches, less than 0.002 inches, or less than 0.001 inches. In the example of FIG. 2A, the diaphragm 204 is a portion of the casing 102 that has been thinned along a chord 205 of its annular cross-section 202. In some examples, the diaphragm 204 can be a separate component that is fixed to the casing 102. In this description, we use "diaphragm" broadly to refer to any element on which a strain gauge 110 may be disposed for measuring the fluid pressure, even if portions of or all of the diaphragm 204 exhibit little or no deformation and even if other elements, such as the temperature-sensitive circuit element 118, are also disposed on the diaphragm. In the example of FIG. 2A, both the strain gauge 110 and the temperature-sensitive element 118 are disposed on the same diaphragm 204; in some examples, the strain gauge 110 and the temperature-sensitive element 118 are disposed on corresponding distinct diaphragms.

In some examples, the strain gauge 110, the temperature-sensitive circuit element 118, or both are disposed on the diaphragm, such that the strain gauge 110 or the temperature-sensitive circuit element 118 are directly in contact with the diaphragm 204. In some examples, the strain gauge 110, the temperature-sensitive element 118, or both, are disposed on the diaphragm with another material or element being disposed between the diaphragm 204 and the strain gauge 110 or the temperature-sensitive circuit element 118. For example, a backing 400 may be between the strain gauge 110 and the diaphragm 204.

Figure 2B:
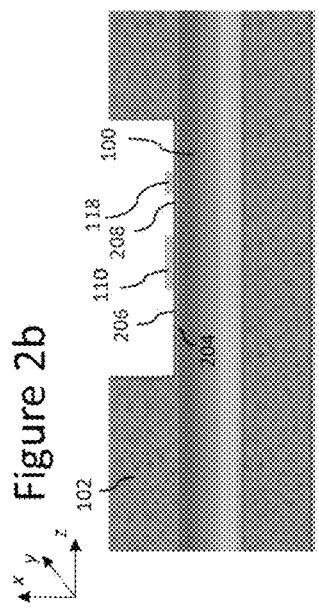
FIG. 2B is a side view of an example casing

As shown in FIGS. 2A-2B, the strain gauge 110 is disposed on a strain-sensing surface 206 of the diaphragm 204. The strain gauge 110 has at least one characteristic responsive to the fluid pressure. For example, the strain gauge 110 can be a resistor or set of resistors in a Wheatstone bridge, and the characteristic responsive to the fluid pressure can be a resistance or set of resistances. To enable sensitivity to fluid pressure, the strain gauge 110 can be disposed on a thin portion of the diaphragm 204, e.g., the thinnest portion of the diaphragm 204. In some examples, the strain gauge can be disposed on a portion of the diaphragm 204 that is not the thinnest portion to, for example, alter the responsiveness of the strain gauge 110 to pressure or temperature changes in the fluid 106.

In some examples, the strain gauge 110 and the temperature-sensitive circuit element 118 are disposed on respective portions of the diaphragm 204 having different thicknesses, which can affect the degree of deformation of the diaphragm 204 that is experienced by each element. In the example of FIGS. 2A-2B, the temperature-sensitive circuit element 118 is disposed closer to an edge of the chord 205, while the strain gauge 110 is disposed at the center of the chord 205.

The temperature-sensitive circuit element 118 is disposed on a temperature-sensing surface 208 of the diaphragm 204, which in the example of FIGS. 2A-2B is the same surface as the strain-sensing surface 206. The strain-sensing surface 206 and the temperature-sensing surface 208 are substantially flat in the y-z plane, e.g., to accommodate attachments of the strain gauge 110 and the temperature-sensitive circuit element 118, respectively. The temperature-sensitive circuit element 118 and the strain gauge 110 are separated along both the y- and z-axes and are disposed apart along the fluid flow path 108 (which is in the direction of z-axis). The temperature-sensitive circuit element 118 and the strain gauge 110 are also separated along the y-axis that partially defines the cross-sectional plane of the casing 102 and fluid flow path 108.

Referring to the example of FIGS. 2C-2D, in the region having the diaphragm 204, the casing 102 is thinned in two adjacent portions 211, 213, having a cross-sectional shape in each portion that is a truncated annulus, as shown in FIG. 2C. The two portions 211, 213 include, respectively, the strain-sensing surface 206 and the temperature-sensing surface 208. The strain gauge 110 and the temperature-sensitive circuit element 118 are disposed on the strain sensing surface 206 and the temperature-sensing surface 208, respectively. The surfaces 206, 208 circumferentially define portions 212 and 214, respectively, of the diaphragm 204. An untruncated surface 216 of the casing circumferentially defines the casing portion 218. The surfaces 206, 208 each run flat along the y-z plane, but the surfaces 206, 208 have different heights on the x-axis, and the portions 211, 213 and their associated surfaces 206, 208 are adjacent and non-overlapping along the z-axis. The edges 207, 209 of the truncated portions define two edges of the diaphragm 204, with the remaining edges defined by the y-axis limits of the surfaces 206, 208.

In the example of FIGS. 2C-2D, the portion 214 of the diaphragm having the temperature-sensing surface 208 is thicker than the portion 212 of the diaphragm having the strain-sensing surface 206. Among other potential advantages, this difference in thickness can reduce deformation of the temperature-sensing surface 208 as compared to deformation of the strain-sensing surface 206, contributing to better accuracy in pressure sensing. For instance, deformation of the temperature-sensing surface 208 can affect characteristics of the temperature-sensitive circuit element 118, which can lead to deformation affecting the temperature compensation of the strain gauge output.

The portion 214 of the diaphragm bearing the temperature-sensing surface 208 can be thinner than the non-diaphragm portions 218 of the casing 102. Among other potential advantages, given a certain thickness of the non-diaphragm portion 218, having a thinner portion 214 bearing the temperature-sensing surface 208 can increase the sensitivity of the temperature-sensitive circuit element 118 to the fluid temperature compared to the case where portions 214 and 218 have the same thickness. However, a variety of relative thicknesses of the diaphragm portions 212, 214 and the casing portion 218 are possible. Here, "thick" and "thin" often refer to radial annular thicknesses of the diaphragm 204 and casing 102; for example, in FIG. 2C, portions 212, 214, and 218 have thicknesses 220, 222, and 224, respectively. Depending on the diaphragm and casing geometries, "thick" and "thin" can also refer to a distance from a surface to a nearest portion of the fluid 106.

In some examples, the surfaces 206, 208 can be non-adjacent, e.g., can be positioned on opposite sides of the casing 102. Rather than having separate positions along the fluid flow path 108, or, equivalently, along the z-axis, the surfaces 206, 208 can be overlapping in their z-axis coordinates. An additional strain gauge can be included on the strain-sensing surface 206 and in line with the fluid flow path 108. The diaphragm 204 can include three distinct surfaces, onto two of which the strain gauge 110 and temperature-sensitive circuit element 118 are disposed. The diaphragm can include a surface with no components on it.

In some examples, the casing features one or more grooves. In the example of FIG. 2D, there are two grooves 226, 228, each running circumferentially around the casing 102 as shown. The diaphragm is positioned between the grooves 226, 228. In examples where, as in FIG. 2D, the casing 102 includes threaded sections 230, 232 to be screwed into a housing or tubing, the screwing can induce stresses in the casing 102, potentially leading to inaccurate or unstable pressure measurements. The presence of grooves can reduce the magnitude of those stresses compared to the same casing without grooves.

The grooves can have variety of geometries and placements. For example, there can be only a single groove, or there can be two or more grooves. The grooves can run circumferentially around the entire casing 102, or the grooves can extend around only a portion of the circumference of the casing 102. The grooves can run along the fluid flow path 108. Grooves may be present at the diaphragm 204 itself, or in between the strain gauge 110 and the temperature-sensitive circuit element 118.

Figure 3:
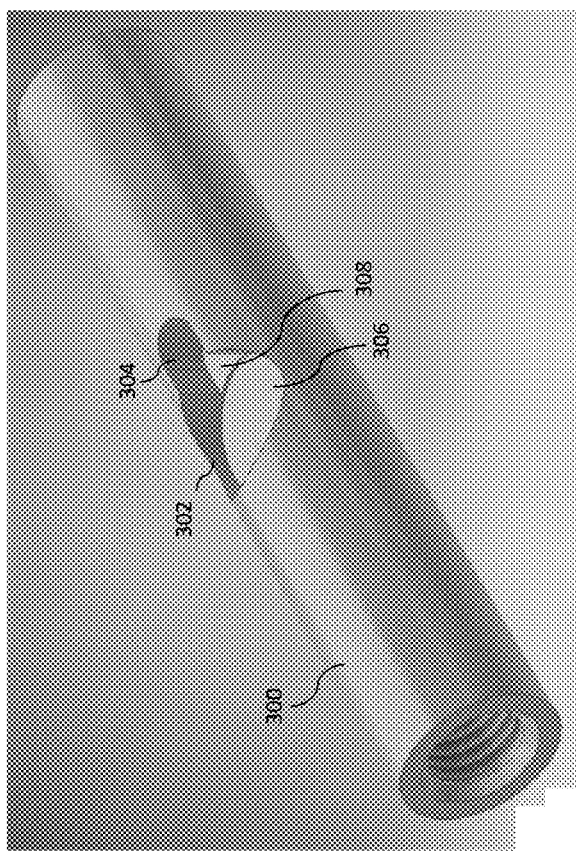
FIG. 3 is a side view of an example casing.

In the example of FIG. 3, a casing 300 has two cutouts 302 and 304, each defining a thinned portion of the casing 300. These thinned portions have surfaces that are the strain-sensing surface 306 and the temperature-sensing surface 308 onto which the strain gauge 110 and the temperature-sensitive circuit element 118, respectively, are disposed (not shown). As previously described, the thinned portions can have unequal thicknesses; for example, the thinned portion under the strain-sensing surface 306 can be thinner than the thinned portion under the temperature-sensing surface 308.

Figure 4:
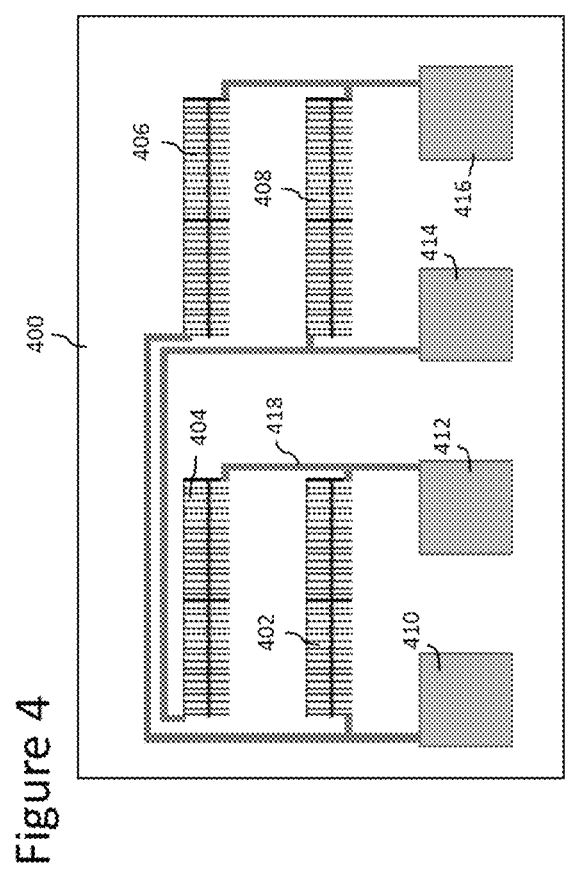
FIG. 4 is a perspective enlarged view of an example backing.

In the example of FIG. 4, the strain gauge 110 is a resistive Wheatstone bridge sensor including four substantially flat resistors 402, 404, 406, 408 disposed on a backing 400. The backing 400 is positioned substantially parallel to and substantially flush with the strain-sensing surface 206 of the diaphragm 204 (not shown), between the strain-sensing surface 206 and the strain gauge 110. The resistors 402, 404, 406, 408 are disposed on the diaphragm 204 and have a resistance that changes upon deformation of the diaphragm 204. For instance, resistors 404 and 406 have a resistance that changes in response to compression, while resistors 402 and 408 have a resistance that changes in response to tension. Each resistor can be a winding metal pattern with dimensions (for example, grid length) of less than 0.01 inches, or dimensions less than 0.02 inches, or dimensions less than 0.05 inches.

In some examples, not all of the resistors are disposed on the diaphragm. For example, two resistors can be disposed on the diaphragm 204 and have resistances that change upon deformation of the diaphragm 204, while two other resistors can be not disposed on the diaphragm 204 and have resistances that do not change upon deformation of the diaphragm 204, or that change less than the change in resistance of the resistors that are disposed on the diaphragm.

The Wheatstone bridge (shown in FIG. 6) has four nodes in between its four resistors. When the diaphragm 204 deforms, the resistors 402, 404, 406, 408 stretch or compress correspondingly, modifying their electrical resistances. Electrical pads 410, 412, 414, 416 on the backing 400, connected by lines 418 to the strain gauge, allow the strain gauge 110 to be electrically coupled to the temperature compensation circuitry 116 and to a power supply.

Temperature differences between the fluid 106 and the environment, or transient temperature changes of the fluid 106 itself, are often reflected faster in the resistors 402, 406 than in the resistors 408, 410, as the former resistors can be in closer thermal contact with the fluid 106. Such temperature differences can even propagate at different rates between the resistors 402 and 404. These temperature imbalances can affect the strain gauge output 112. For example, temperature imbalances can affect the conductivity of strain gauge elements and the mechanical and deformation properties of the diaphragm. Any of these or other temperature-related effects can alter the strain gauge output 112 for a given fluid pressure.

The backing 400 can be a flexible material such as polyimide or polyester. Rigid materials like those in traditional PCB boards can also be used. The material can be electrically and/or thermally insulating. Because the thickness of the backing 400 affects the rate of heat flow between the strain gauge 110 and the diaphragm 204 and fluid 106, the backing thickness can be chosen so that a thermal time constant for heat flow between the strain gauge 110 and the fluid 106 is close to (for example, within 5% of, or within 10% of, or within 20% of) a thermal time constant for heat flow between the temperature-sensitive circuit element 118 and the fluid 106. The thermal time constants can also be affected by other parameters, for example, the thicknesses of the diaphragm portions on which the strain gauge 110 and the temperature-sensitive circuit element 118 are disposed.

The strain gauge 110, electrical pads 410, 412, 414, 416, and lines 418 can be fabricated by depositing a metal film onto the backing 400 and then selectively etching away the metal to leave behind the desired pattern.

The temperature-sensitive circuit element 118 can be a resistor on a separate backing or on the same backing as the strain gauge. The temperature-sensitive circuit element's backing is substantially parallel to and substantially flush with the temperature-sensing surface 208. The resistor material can be sensitive to temperature changes—for example, the temperature-sensitive circuit element can be made of nickel. The temperature-sensitive circuit element's backing can be flexible or rigid, and can be either mechanically coupled to the backing 400 or unconnected to it. In some examples, the temperature-sensitive circuit element 118 is on the same backing 400 as the strain gauge 110. As described above for the backing 400, the temperature-sensitive circuit element's backing can have a thickness that achieves a target thermal time constant for heat transfer between the fluid 106 and the temperature-sensitive circuit element 118.

In some examples, the strain gauge 110 and temperature-sensitive circuit element 118 can include capacitors, diodes, or other appropriate elements in addition to or instead of resistors. In some examples, deformation of the diaphragm can be measured optically. Although a full-bridge Wheatstone configuration was described, quarter-bridge or half-bridge configurations are also possible, as are alternative strain gauge designs that do not include a Wheatstone bridge.

As shown in FIG. 5A, the temperature compensation circuitry 116 is electrically connected to the strain gauge 110 and to the temperature-sensitive circuit element 118. The strain gauge output 112 and the output 119 of the temperature-sensitive circuit element are both provided to the temperature compensation circuitry 116. The temperature compensation circuitry 116 modifies the strain gauge output 112 based on the output of the temperature-sensitive circuit element to produce a circuitry output 512. The temperature compensation circuitry 116 can also make modifications that are not linked to temperature, such as signal amplification or filtering.

The strain gauge output 112 can be adjusted to achieve temperature-induced pressure span correction, which is compensation for temperature-induced changes in the ratio of strain gauge output to unit mechanical input. An example of a span error is as follows: if at a first temperature two different deformations induce outputs of 30 volts and 60 volts, respectively, the same deformations at a second temperature could induce outputs of 31 volts and 62 volts. Compensating for this change in the "span" of the output would mean keeping the voltage outputs at a given deformation substantially constant across temperatures.

The strain gauge output 112 can be adjusted to achieve non-temperature-induced pressure span correction, which is the correction of the strain gauge output to achieve a desired ratio of strain gauge output to unit mechanical input. This quantity can be substantially set by the apparatus design, but variations in manufacture or installation mean that incorporating a means of modification can be useful.

The strain gauge output 112 can be adjusted to achieve temperature-induced zero balance pressure correction, which is the correction for temperature-induced imbalances in a strain gauge that cause the strain gauge to produce nonzero output at zero load. Such zero shifts with temperature change can occur even in strain gauge configurations (like full-bridge Wheatstone configurations) that are substantially insensitive to temperature.

The strain gauge output 112 can be adjusted to achieve non-temperature-induced zero balance pressure correction, which is the compensation for non-temperature-induced imbalances in a strain gauge that cause the strain gauge to produce nonzero output at zero load. As-fabricated strain gauges can indicate pressures that are offset from the actual pressures being measured, and non-temperature-induced zero balance pressure correction can at least partially compensate for this offset.

In the example of FIG. 5B, the temperature compensation circuitry 116 contains multiple stages 502, 504, 506, 508 that in turn modify the strain gauge output 112 and its modified forms 510, 510', and 510". For example, the first stage 502 can perform temperature-induced zero balance pressure correction; the second stage 504 can perform temperature-induced pressure span correction; the third stage 506 can perform non-temperature-induced zero balance pressure correction; and the fourth stage 508 can perform non-temperature induced pressure span correction, with the resulting circuitry output 512 reflecting a more accurate and stable fluid pressure determination than would be output without one or more of the compensating steps. In some examples, the functions depicted in FIG. 5B can be combined into fewer stages, multiple compensating steps can be performed in parallel or simultaneously, the functions can be performed in a different order, or some of the aforementioned compensation steps may not be performed at all.

The temperature compensation circuitry 116 can also perform functions in addition to or instead of the above compensation steps. For example, the temperature compensation circuitry 116 can perform signal amplification or filtering or otherwise prepare the circuitry output 512 for use as a pressure-indicating quantity. Signals or data including the strain gauge output 112, the temperature-sensitive circuit element's output 119, modified forms of the strain gauge output 510, 510', 510", and the circuitry output 512 can take any of a number of forms, including voltages and currents, and may be analog, digital, or both, in different parts of the device.

The temperature compensation circuitry 116 can include one or more adjustable elements that aid in correcting or otherwise modifying the strain gauge output 112. These adjustable elements can include, for example, potentiometers adjustable by a user of the device. The temperature compensation circuitry's performance of, for example, temperature-induced pressure span correction can depend on the setting of the potentiometer. In some examples, a user can follow a procedure, the procedure in some cases incorporating an algorithm, to calibrate the device by adjusting the one or more adjustable elements. The adjustable elements can also be self- or automatically-adjusting; for example, the adjustable elements can include a microcontroller.

Figure 6:
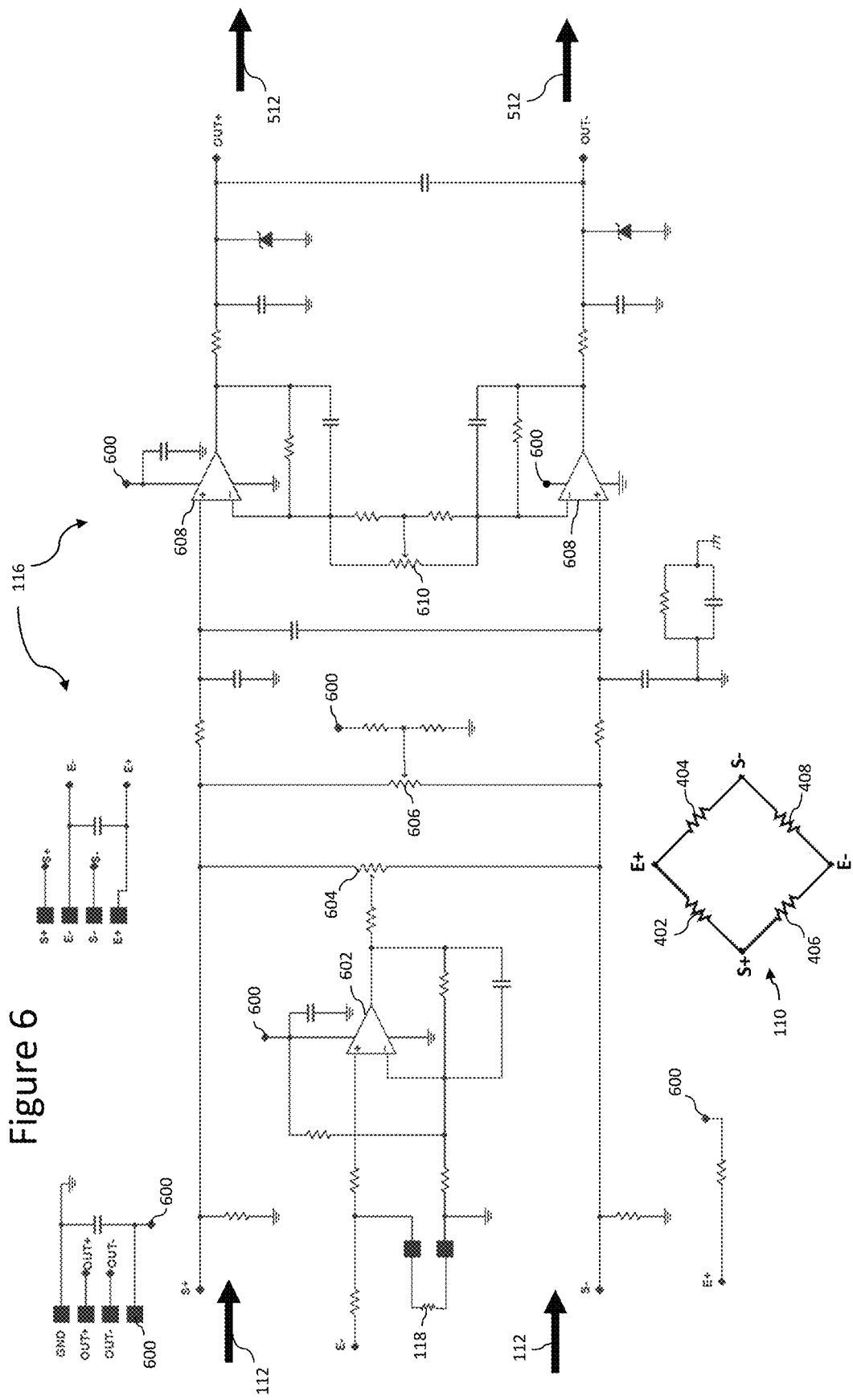
FIG. 6 is a schematic of an example temperature compensation circuitry.

An example of the temperature compensation circuitry 116 is shown in FIG. 6. Voltages are provided at supply inputs 600. As the temperature of the temperature-sensitive circuit element 118 (in this example a resistor) increases, a temperature-varying voltage is provided to an op-amp 602 and amplified, and a current is applied to the arms of the Wheatstone bridge strain gauge 110 in a ratio dependent on the setting of an adjustable circuit element 604, which is a potentiometer in this example. For certain values of the resistance of the resistor 118, temperature-induced zero balance pressure correction of the strain gauge output 112 is carried out. Meanwhile, the potentiometer 604 can be adjusted in a calibration procedure that makes use of pressure measurements at multiple temperatures, with the potentiometer setting making the circuitry 116 perform temperature-induced pressure span correction.

An adjustable circuit element 606, in this example a potentiometer, can be adjusted via a calibration procedure and will, when at certain settings, allow the circuitry 116 to perform non-temperature-induced zero balance pressure correction on the strain gauge output or the modified strain gauge output. The resulting signal is amplified through two op-amps 608, and non-temperature-induced pressure span correction is performed using a calibrated potentiometer 610. The circuitry output 512 can then be read via the OUT+/OUT− terminals.

Various examples of the temperature compensation circuitry 116 can include the above and other appropriate elements. Digital components such as microcontrollers and analog-to-digital converters can be provided to assume functions otherwise performed by analog elements. Manual calibration of the potentiometers can be replaced by automatic calibration by microcontrollers. Some examples of the temperature compensation circuitry 116 can contain specialized communication elements, such as cable inputs and wireless networking devices. The circuitry 116 can contain a battery to enable wireless use. The circuitry 116 can contain a microprocessor, a memory, and electronic storage for performing data analysis and storing, for example, pressure data over time. The circuitry 116 can include a processor to execute a machine learning process stored in a memory and incorporate the machine learning process into the circuitry's operation.

Figure 7:
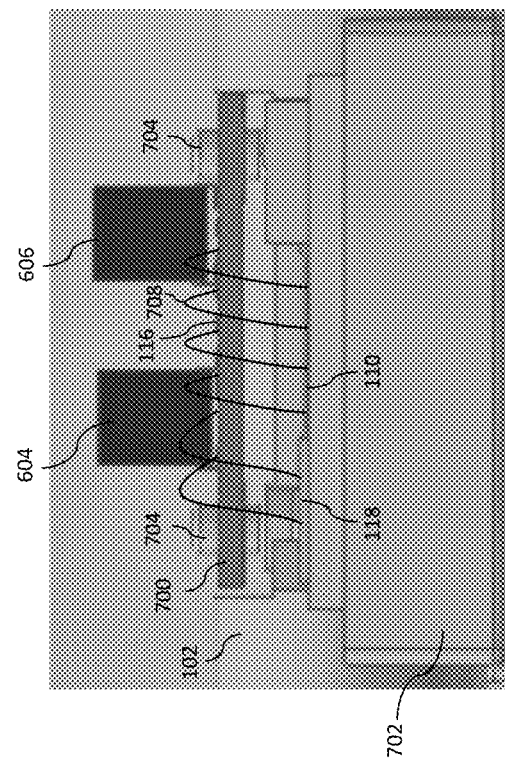
FIG. 7 is a cutaway view of an example housing with a pressure measurement device.

In the example of FIG. 7, the temperature compensation circuitry 116 is on a printed circuit board 700 lying within a housing 702 that also contains the strain gauge 110, the temperature-sensitive circuit element 118, associated backings (not shown), and portions of the casing 102. The circuit board 700 is held to the casing by posts 704. Wires 708 connect the temperature compensation circuitry 116 to the strain gauge 110 and the temperature-sensitive circuit element 118. The temperature compensation circuitry 116 can include elements (for example, as shown in FIG. 7, the potentiometers 604, 606) that project above the printed circuit board 700).

Referring again to FIG. 1, the casing 102 is configured such that the entire inner volume defined by the casing is encompassed by the fluid flow channel 100 along the direct fluid flow path 108. For example, the fluid flow channel 100 is a cylinder, and the inner surfaces of the casing and diaphragm form a cylinder that matches the outer surfaces of the fluid flow channel's cylinder, without the incorporation of a tee or other branching path leading to a dead-end that cannot accommodate continuous flow. Such dead-end volumes are known as "dead volume," and so designs according to this example are known as "zero dead volume" sensors. Having zero dead volume can provide advantages over alternatives in which, for example, fluid pressure is measured at a tee. For example, traces of measured fluids can become trapped inside dead volume, reducing device hygiene if, for example, the fluid in question is blood. Dead volume can also provide a locus for bacterial growth.

The pressure measurement device 101 can incorporate features that enable easy connection to external tubes or pipes. For example, the casing 102 can include quick connect fittings, threaded fittings, or flanged fittings. Ends of the casing 102 can be narrowed to receive plastic tubes sealed tightly over the casing. The casing 102 can define a wider fluid flow channel 100 at its ends than where the fluid pressure is to be measured, in order to match standard tubing thicknesses. The casing's cross-sectional diameter or width can be much larger than the diameter or width of the fluid flow channel 100, in order to enhance the device's mechanical stability and resiliency.

Figure 8:
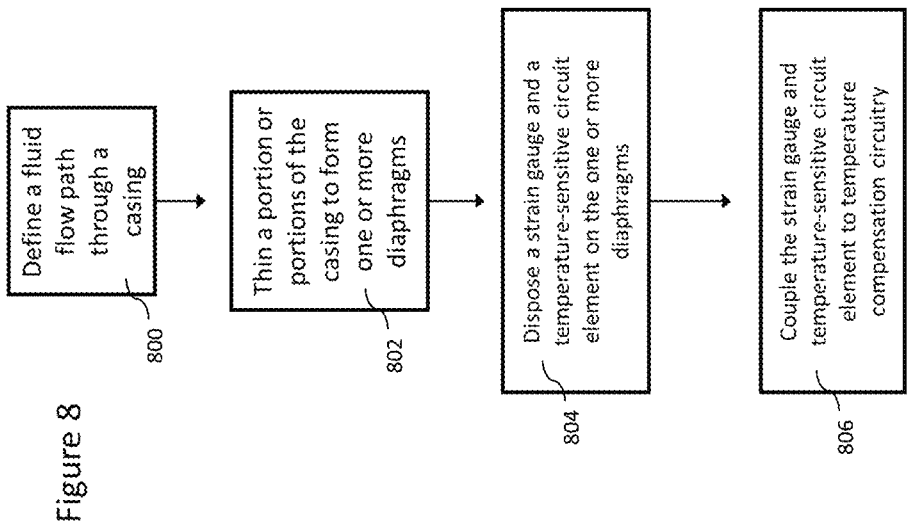
FIGS. 8-9 are flow charts.

Examples of the pressure measurement device can be manufactured according to the following example method, shown in FIG. 8. A fluid flow path is defined through a casing (800). The casing, initially having a uniform cross-sectional shape along a portion of its length, is thinned on one side to form one or more diaphragms (802). Further or uneven thinning can create portions of the one or more diaphragms having different thicknesses. Two or more separate portions of the casing can be thinned. A strain gauge and a temperature-sensitive circuit element are disposed on the one or more diaphragms (804). The strain gauge and the temperature-sensitive circuit element are connected to a temperature compensation circuitry, which can be configured and calibrated as described above (806). Grooves can also be formed in the casing, as described above.

Figure 9:
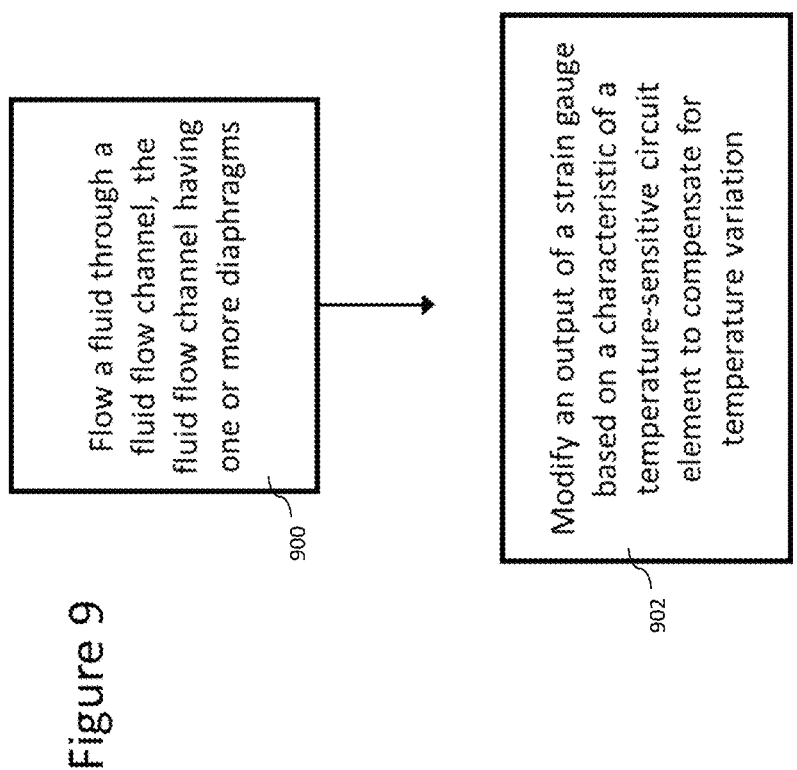

The pressure measurement device can be utilized to execute methods including the example shown in FIG. 9. A fluid is flowed through a fluid flow channel, the fluid channel being defined by a casing having a diaphragm or diaphragms (900). In some implementations, a strain gauge and a temperature-sensitive circuit element are disposed on the diaphragm or diaphragms, the strain gauge having a characteristic responsive to a pressure of the fluid, the temperature-sensitive circuit element having a characteristic responsive to temperature. An output of the strain gauge is modified based on the characteristic of the temperature-sensitive circuit element that is responsive to temperature (902). Examples of possible modifications are, as described above, temperature-induced zero balance pressure correction, temperature-induced pressure span correction, non-temperature-induced zero balance pressure correction, and non-temperature-induced pressure span correction. In some examples, an adjustable circuit is used to calibrate the modification of the output of the strain gauge.

Particular examples of the subject matter have been described. Other examples are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An apparatus comprising:
   a casing defining a fluid flow channel, the casing comprising one or more diaphragms each defining a portion of the fluid flow channel,
   a strain gauge disposed on one of the one or more diaphragms, the strain gauge having a characteristic responsive to a pressure of fluid in the fluid flow channel,
   a temperature-sensitive circuit element disposed on one of the one or more diaphragms, the temperature-sensitive circuit element having a characteristic responsive to a temperature of the fluid in the fluid flow channel,
      wherein the strain gauge and the temperature-sensitive circuit element are both disposed on the same particular diaphragm,
      wherein the strain gauge is disposed on a flat surface of a first portion of the particular diaphragm, and
      wherein the temperature-sensitive circuit element is disposed on a flat surface of a second portion of the particular diaphragm, and
   temperature compensation circuitry electrically coupled to the strain gauge and to the temperature-sensitive circuit element.

2. The apparatus of claim 1, wherein the temperature compensation circuitry is configured to modify an output of the strain gauge based on the characteristic of the temperature-sensitive circuit element to compensate for temperature variation.

3. The apparatus of claim 1, wherein the one or more diaphragms are configured to deform in response to the pressure of the fluid.

4. The apparatus of claim 1, wherein an output of the strain gauge is indicative of a pressure of the fluid.

5. The apparatus of claim 1, in which
   a thickness of the second portion is greater than a thickness of the first portion.

6. The apparatus of claim 1, wherein the first portion and the second portion are configured to deform in response to the pressure of the fluid, and wherein, at a given fluid pressure, a degree of deformation of the first portion is greater than a degree of deformation of the second portion.

7. The apparatus of claim 1, wherein the strain gauge is mounted on a backing, the backing providing a thermal time constant for heat transfer between the fluid and the strain gauge that is substantially equal to a thermal time constant for heat transfer between the fluid and the temperature-sensitive circuit element.

8. The apparatus of claim 1, wherein the temperature-sensitive circuit element comprises a resistor.

9. The apparatus of claim 8, wherein the resistor has a resistance value sufficient to compensate for temperature-induced pressure span error in an output of the strain gauge.

10. The apparatus of claim 8, wherein the resistor has a resistance value sufficient to compensate for temperature-induced zero balance pressure error in an output of the strain gauge.

11. The apparatus of claim 1, wherein the temperature-sensitive circuit element comprises a diode.

12. The apparatus of claim 1, wherein the temperature compensation circuitry comprises an adjustable circuit element adjustable to calibrate the temperature compensation circuitry.

13. The apparatus of claim 12, wherein the adjustable circuit element comprises a potentiometer.

14. The apparatus of claim 12, wherein the adjustable circuit element is automatically adjustable.

15. The apparatus of claim 1, wherein the temperature compensation circuitry comprises a microcontroller configured to calibrate the temperature compensation circuitry.

16. The apparatus of claim 1, wherein the strain gauge comprises one or more resistors of a set of multiple resistors forming a Wheatstone bridge.

17. The apparatus of claim 16, wherein the Wheatstone bridge is configured in a full-bridge arrangement.

18. The apparatus of claim 1, wherein a groove is defined in the casing.

19. The apparatus of claim 1, wherein the casing has a diameter of less than 0.06 inches.

20. The apparatus of claim 1, wherein at least one of the one or more diaphragms has a thickness of less than 0.008 inches.

21. The apparatus of claim 1, wherein the strain gauge and the temperature-sensitive circuit element are separated along a fluid flow direction of the fluid in the fluid flow channel.

22. The apparatus of claim 1, wherein the strain gauge and the temperature-sensitive circuit element are separated along a circumferential direction with respect to a fluid flow direction of the fluid in the fluid flow channel.

23. The apparatus of claim 1, wherein each of the first portion of the particular diaphragm and the second portion of the particular diaphragm is a truncated annulus.

24. A method comprising:
flowing a fluid through a fluid flow channel, one or more diaphragms each defining a portion of the fluid flow channel,
wherein a characteristic of a strain gauge disposed on a flat surface of a first portion of a particular diaphragm of the one or more diaphragms is responsive to a pressure of the fluid in the fluid flow channel, and
wherein a characteristic of a temperature-sensitive circuit element disposed on a flat surface of a second portion of the particular diaphragm is responsive to a temperature, and modifying an output of the strain gauge based on the characteristic of the temperature-sensitive circuit element to compensate for temperature variation.

25. The method of claim 24, wherein the characteristic of the strain gauge is responsive to a deformation of the particular diaphragm.

26. The method of claim 24, comprising determining the pressure of the fluid in the fluid flow channel based on the modified output of the strain gauge.

27. The method of claim 24, in which modifying the output of the strain gauge comprises applying a voltage to a terminal of the strain gauge, wherein the applied voltage is based on the characteristic of the temperature-sensitive circuit element.

28. The method of claim 24, wherein a thickness of the second portion of the particular diaphragm is greater than a thickness of the first portion of the particular diaphragm.

29. A method for fabricating a pressure gauge, comprising:
defining a fluid flow path through a casing,
thinning a portion of the casing to form a diaphragm, and
disposing a strain gauge and a temperature-sensitive circuit element on the diaphragm, the strain gauge having a characteristic responsive to a pressure of fluid in the fluid flow path, and the temperature-sensitive circuit element having a characteristic responsive to temperature.

30. The method of claim 29, wherein the thinning comprises thinning a first portion of the casing to a first thickness and thinning a second portion of the casing to a second thickness, the second thickness being greater than the first thickness.

31. The method of claim 30, comprising disposing the strain gauge on the first portion of the diaphragm and disposing the temperature-sensitive circuit element on the second portion of the diaphragm.

32. The method of claim 31, wherein the first portion and the second portion are flat.

33. The method of claim 29, comprising electrically coupling an output of the strain gauge and an output of the temperature-sensitive circuit element to temperature compensation circuitry, wherein the temperature compensation circuitry is configured to modify the output of the strain gauge based on the characteristic of the temperature-sensitive circuit element.

34. An apparatus comprising:
a casing defining a fluid flow channel, the casing comprising one or more diaphragms each defining a portion of the fluid flow channel,
a strain gauge disposed on one of the one or more diaphragms, the strain gauge having a characteristic responsive to a pressure of fluid in the fluid flow channel,
a temperature-sensitive circuit element disposed on one of the one or more diaphragms, the temperature-sensitive circuit element having a characteristic responsive to a temperature of the fluid in the fluid flow channel,
wherein the strain gauge is mounted on a backing, the backing providing a thermal time constant for heat transfer between the fluid and the strain gauge that is substantially equal to a thermal time constant for heat transfer between the fluid and the temperature-sensitive circuit element, and
temperature compensation circuitry electrically coupled to the strain gauge and to the temperature-sensitive circuit element.

35. The apparatus of claim 34, wherein the backing is composed of a flexible material.

36. The apparatus of claim 35, wherein the backing comprises polyimide or polyester.

37. The apparatus of claim 34, wherein the temperature-sensitive circuit element is mounted on the backing.

38. The apparatus of claim 34, wherein the thermal time constant for heat transfer between the fluid and the strain gauge is based on a thickness of the backing.

39. The apparatus of claim 34, wherein the strain gauge comprises a metal film on the backing.

\* \* \* \* \*